Jan. 23, 1934.  L. A. HUDSON  1,944,326
SYSTEM OF REMOTE CONTROL
Filed Sept. 29, 1928  2 Sheets-Sheet 1

Inventor
Leo A. Hudson
By his Attorney

Jan. 23, 1934.    L. A. HUDSON    1,944,326
SYSTEM OF REMOTE CONTROL
Filed Sept. 29, 1928    2 Sheets-Sheet 2
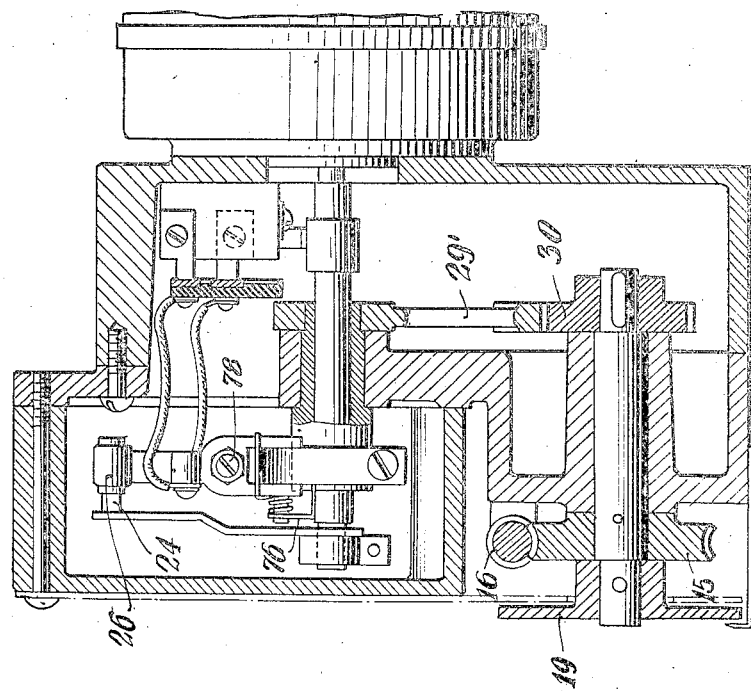
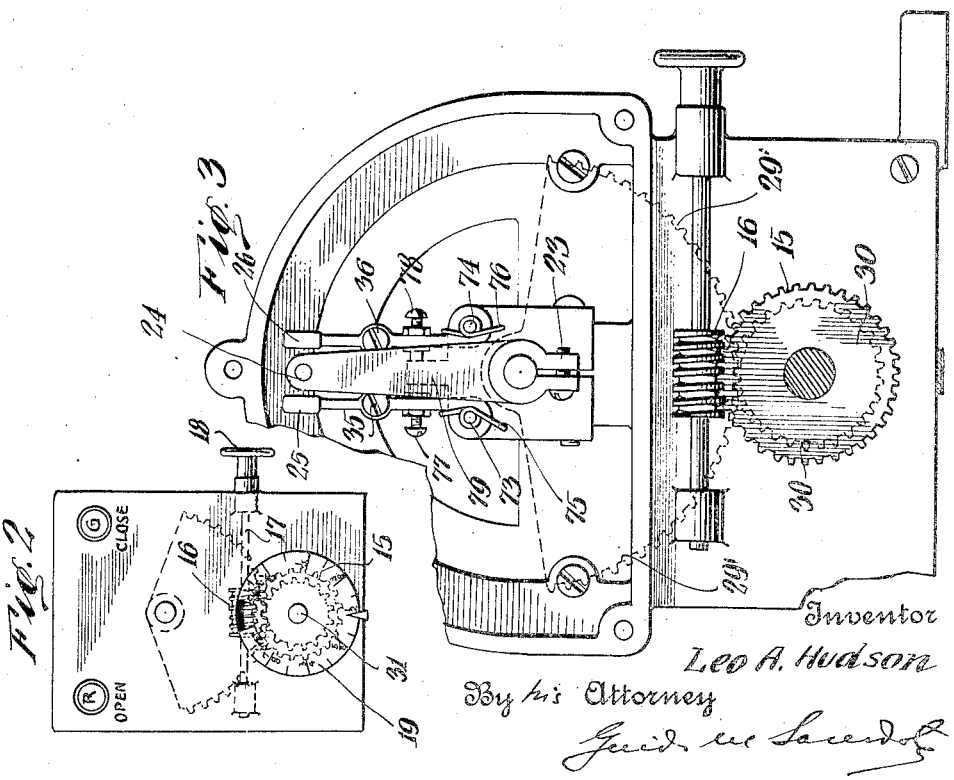
Inventor
Leo A. Hudson
By his Attorney Patented Jan. 23, 1934

1,944,326

UNITED STATES PATENT OFFICE 1,944,326

SYSTEM OF REMOTE CONTROL

Leo A. Hudson, Glenbrook, Conn.

Application September 29, 1928
Serial No. 309,346

22 Claims. (Cl. 172—239)

This invention relates to systems for controlling the operation of a device or devices from a point at a distance therefrom, and more particularly refers to improvements in limit switches of the adjustable type for controlling both the direction and extent of the operation of the device or devices controlled thereby.

The primary object of this invention is to provide a novel and improved arrangement for controlling the operation of a device from a distant point, whereby by employing a limit switch of a suitable design the extent and direction of movement of the driven member at the operating end can be positively determined in advance from the controlling end.

Another object is to provide a novel, extremely simple and dependable system of limit switch control, adapted to be used in connection with devices comprising an element displaceable in either direction from one extreme position to another.

Other objects and advantages of the present invention will more fully appear as the description proceeds and will be set forth and claimed in the appended claims.

In systems of remote control, it is often desirable not only to automatically cause the termination of the operation of the controlled device when one of the extreme positions of its driven element has been reached, but also to determine in advance any point intermediate of the two extreme positions at which the operation may be terminated as well as the direction and extent of the next movement from said intermediate point. More particularly, my system comprises two electrically connected synchronous motors, one comprising a receiver connected with an index device, and the other interconnected with a controlling device, the rotors of the synchronous motors tending to remain in positional agreement with one another. My invention resides in arranging the rotor of the controlling device so that it will rotate through less than the particular angle beyond which directional control thereof relatively to the index rotor is impossible, the exact angle being 180 degrees. More essentially, it is the object of my invention to interconnect the controlling device and its rotor so that while the rotor may rotate through only an angle less than the particular critical angle indicated, the controlling device may be capable of rotating through relatively unlimited angles, so as to have the full degree of movement necessary to its complete functioning. It is the more detailed object of the invention to interconnect the rotor of the index device so that the rotor is itself capable only of rotation through an angle of less than that beyond which it may not be controlled directionally relatively to the rotor of the controlling device while permitting the full functioning of the index device to permit the necessary movement of the controlling device.

My invention affords a convenient means of obtaining these results without entailing the use of unnecessarily complicated mechanism and an embodiment thereof is illustrated by way of example in the accompanying drawings.

In the same, Fig. 1 illustrates in diagrammatic form my invention as applied to the regulation of the operation of a valve.

Fig. 2 is a detail front elevation of the control board;

Fig. 3 is a detail front view in elevation of the reversing switch forming one of the features of my invention; and Fig. 4 is a side sectional view in elevation thereof.

Figure 1:
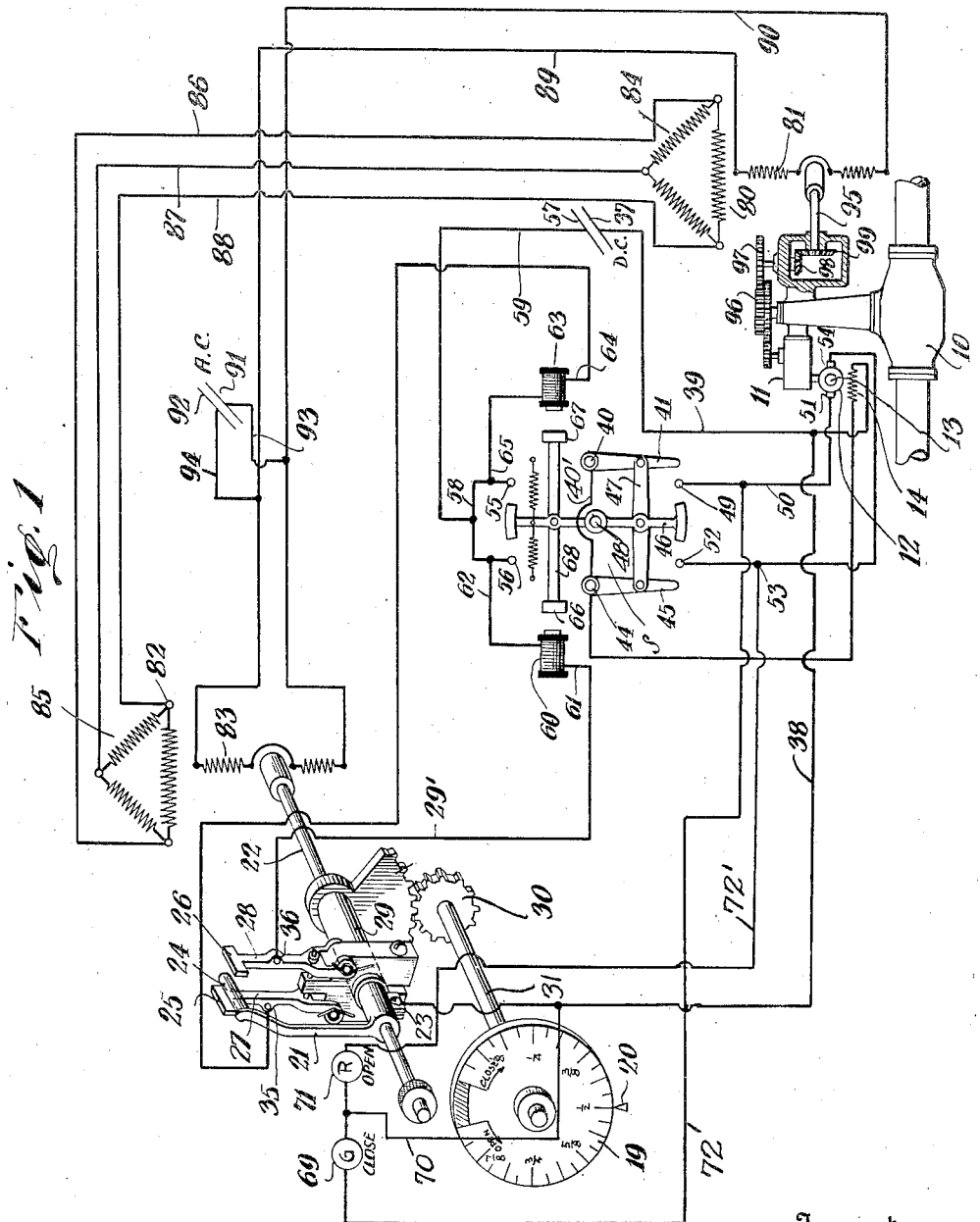

Referring to Fig. 1, 10 designates a valve which may be operated by means of an operating mechanism 11 actuated by a reversible motor 12 comprising an armature 13 and a field winding 14.

The operation of said motor is controlled by a switch at the controlling end, said switch being adapted to be set by the operator in any desired position so as to predetermine in advance the direction and the extent of the travel of the valve.

The switch proper comprises a central finger 21, mounted on a shaft 22, said finger being provided with a terminal 23 and a contact member 24, and being adapted to close the motor circuit by contacting with either contact member 25 or 26 carried by arms 27, 28 respectively mounted one on each side of said finger, on a sleeve 29 rotatably mounted on shaft 22.

Sleeve 29 carries a segment 29' which meshes with a pinion 30 carried by another shaft 31, on which is mounted a worm wheel 15. Said worm wheel is in mesh with a worm 16 carried by a shaft 17 actuated by a hand wheel 18.

Shaft 31 also carries a dial 19 rotatable therewith, said dial cooperating with a stationary pointer 20 in providing indications corresponding to the actual position of the valve at the other end when the device is inoperative.

By rotating hand wheel 18 one way or the other, dial 19 can be brought to another position with respect to the pointer 20 and this new position determines the new position to be reached by the valve.

If shaft 31 is angularly displaced in a clockwise direction, so as to cause angular displacement of sleeve 29 in a counterclockwise direction, contact member 26 will bear against contact member 24 and will close the motor circuit through terminal 36 integral with arm 28.

The motor circuit is closed through the energization of a relay so as to rotate armature 13 to operate valve 10 in the closing direction.

The reverse takes place if shaft 31 is rotated in a counterclockwise direction; in this case, contact member 25 will bear against contact member 24 and will close the motor circuit through terminal 35 integral with arm 27 so as to cause the rotation of armature 13 to operate the valve in the opening direction.

As stated, the angular displacement of sleeve 29 in one or the other direction causes the energization of a relay which in its turn will cause the operation of a reversing switch S establishing the proper connections in the motor circuit so as to rotate the motor in one or the other direction.

Terminal 23 is connected to main line wire 37 through wires 38, 39. On terminal 40 is pivotally mounted a contact arm 41, and on another terminal 44 connected thereto by a bridge connection 40' is pivotally mounted a contact arm 45.

Contact arms 41, 45 are simultaneously movable in one or the other direction by the action of a reversing switch arm 46 to which they are connected by a bar 47. Switch arm 46 is pivotally mounted at 48 and when it is angularly displaced in a counterclockwise direction it causes arm 45 to bear against another contact terminal 52 connected by a wire 53 to the other pole 54 of armature 13.

Switch arm 46 also establishes connection between terminal 52 and another terminal 55 when it is moved in a clockwise direction to one of its extreme positions and between terminal 49 and another terminal 56 when it is moved in a counterclockwise direction to its other extreme position; terminals 55, 56 are both connected to the other main line wire 57 through bridge connection 58 and a wire 59.

An electromagnet 60 is inserted between terminal 36 and wire 58 by means of wires 61, 62, and another electromagnet 63 coaxial therewith is inserted between terminal 35 and wire 58 by means of wires 64, 65.

The armatures 66, 67 of said electromagnets are carried by a cross member 68 attached to main switch arm 46, so that if electro-magnet 60 is energized, switch arm 46 will move in a counterclockwise direction while if electro-magnet 63 is energized switch arm 46 will move in a clockwise direction.

By virtue of this arrangement, when sleeve 29 is angularly displaced in a counterclockwise direction, contact member 26 will bear against contact member 24 and will cause the energization of electro-magnet 60 the circuit of which may be traced from line wire 37, through wire 39, wire 38, terminal 23, arm 21, contact members 24, 26, arm 28, terminal 36, wire 61, electro-magnet 60, wire 62, bridge 58, and back to line wire 57, through wire 59. Electro-magnet 60 will attract its armature 66 causing switch arm 46 to move in a counterclockwise direction, closing the motor circuit so as to cause rotation of armature 13 to operate the valve in the closing direction.

The motor circuit can now be traced from line wire 37, wire 39, field 14, terminal 44, arm 45, terminal 52, wire 53, armature 13, wire 50, terminal 49, switch arm 46, terminal 56 and back to main line wire 57 through bridge connection 58 and wire 59.

If on the other hand sleeve 29 is angularly displaced in a clockwise direction, contact member 25 will bear against contact 24 thereby closing the circuit of electro-magnet 63 which will be energized and will in its turn cause angular displacement of switch arm 46 in a clockwise direction, so as to establish communication between terminals 52 and 55.

The motor circuit can now be traced from main line wire 37 through wire 39, field 14, terminal 44, bridge connection 40', terminal 40, arm 41, bridge connection 49, wire 50, armature 13, wire 53, terminal 52, switch arm 46, terminal 55 and back to main line wire 57 through bridge connection 58 and wire 59, operating the valve in the opening direction.

Suitable means may be provided if desired, indicating the operation of the valve in one or the other direction; for instance, a green bulb 69 and a red bulb 71 may be connected to wire 38 by a wire 70, bulb 69 being further connected to wire 50 by a wire 72 and bulb 71 being connected to wire 53 by a wire 72'; so that when electromagnet 60 is energized, bulb 69 will glow indicating that the valve is being operated in the closing direction, and when electromagnet 63 is energized instead bulb 71 will glow indicating that the valve is being operated in the opening direction; when both bulbs are deenergized the indication will be that no operation of the valve is taking place.

The arrangement so far described, comprises all the elements which are required to set the motor circuit in its operative position so as to actuate the valve in one or the other direction. The arrangement also includes suitable means, controlled by the valve or other device driven by the motor 12 for automatically restoring the motor circuit to its inoperative position when a predetermined position has been reached in accordance with the displacement of dial 19 with respect to pointer 20.

It will be observed that the graduation of dial 19 corresponds to the various positions of the valve and that the dial may be rotated almost 360° causing an angular displacement of segment 29' somewhat less than 180°.

In order to meet this condition arms 27, 28 are yieldingly mounted, being pivoted at 73, 74, respectively and being maintained in their normal position shown by spiral springs 75, 76. Said arms are also normally held at a distance from contact member 24 by means of screws 77, 78, abutting against a lug 79, said screws providing for adjustment of said distance.

It follows that if the dial is rotated a certain quantity one way or the other, the corresponding arm 27 or 28 will be deflected from its normal position after closing the motor circuit with contact member 24. It is obvious that if now means are provided for moving finger 21 away from the arm contacting therewith, that is, in the same direction in which the arm has previously been moved, the circuit can once more be interrupted; the arm following the finger by the action of its respective spring 75 or 76 until its screw 77 or 78 abuts against lug 79 when a further movement of finger 21 will finally interrupt the circuit.

In order to obtain this result, I provide a transmitting device having a movable member operatively associated with a valve or other controlled device, and a receiving device having a movable member operatively associated with shaft 22 at the controlling end; said movable member of the receiving device tending to remain at all times in positional agreement with the movable member or transmitting device.

The movable member of the transmitting device is operated by the valve or other controlled device so as to produce angular displacements of the movable member of the receiving device and of shaft 22 operable thereby, so as to move finger 21 in a circuit opening direction. The connection between the valve and the movable member is such that the complete operation of the valve through all its rotation will cause less than a 180° rotation of the movable member. The reason for this will be explained hereinafter.

In the embodiment shown, I add to the system described, another electric circuit including two synchronous motors of the type often used for transmitting angular motion, one of said motors 80 that I will call the transmitter, having its rotor 81 operatively connected to the valve and the other motor 82 that I will call the receiver, having its rotor 83 mounted on shaft 22 at the regulating end.

Motors 80, 82, also comprise polycircuit field windings 84, 85, mounted on their stator elements. These field windings are shown as three circuit field-connected windings, and are interconnected through bus wires 86, 87, 88.

The armature windings 81, 83 are also electrically connected by bus wires 89, 90 so as to be energized from a suitable source of alternating current supply 91, 92, through wires 93, 94.

Rotor 81 at the transmitting end is mounted on a shaft 95 which is operatively associated with the valve 10 through pinion 96, spur gear 97 and bevel gears 98, 99, so that a given translatory movement of the valve stem, corresponding to a given rotatory movement of pinion 96 will result in a given angular displacement of shaft 95 and is rather high so that a relatively large amount of travel of the valve stem will result in a relatively small angular displacement of rotor 81.

When the valve is operated by motor 12, rotor 81 will be angularly moved from its normal position in one or the other direction, and in accordance with the well known mode of operation of this type of motors, voltages will be induced in the various legs of the field winding 84 which voltages are impressed on the responsive field winding 85 connected thereto, causing an angular displacement of rotor 83 of the same direction and value as that of rotor 81.

The connections between the valve and shaft 95 are such that when the valve is operated in the closing direction, shaft 95 and rotor 81 carried thereby are angularly displaced in a counterclockwise direction, while when the valve is operated in the opening direction, said shaft and rotor are angularly displaced in a clockwise direction with reference to Fig. 1.

These angular displacements produce equivalent displacements of rotor 83 and shaft 22 and therefore arm 21 with its contact member 24 will follow.

By virtue of this arrangement, as explained before, when dial 19 is rotated in a clockwise direction, sleeve 29 will be angularly displaced in a counterclockwise direction so as to cause the motor circuit to operate the valve in the closing direction.

As soon as the operation of the valve starts, armature 81 is rotated in a counterclockwise direction and likewise armature 83 and finger 21 will rotate in the same direction. Therefore, finger 21 will move away from arm 28 which however is following it due to the action of its spring 76.

However, when the valve is about to reach its new position for which dial 19 has been set, screw 78 of arm 28 will come to rest against lug 79 and the return movement of arm 28 will come to an end, while finger 21 still continues to move until the circuit is interrupted. The valve will therefore now occupy the position for which the dial has been set and the dial indicates this new position.

The conditions governing the possible displacement of finger 21, armature 83 and arms 27, 28 from their normal vertical position shown are mainly dependent upon the correct proportioning of the various parts and merely call for the application of ordinary engineering skill and practice; the proportioning of the various parts being in its turn dependent upon conditions to be met in each case.

One desirable condition which may be mentioned here is that the gearing connecting shaft 95 to pinion 96 should be so proportioned that the angular displacement of armature 81 from one extreme to the other may be somewhat less than 180° for the maximum displacement of the valve from fully open to fully closed position.

By thus preventing the possibility of the armatures swinging up to or beyond 180° a condition is insured whereby it becomes impossible for the two synchronous motors to get out of step even if something should go wrong with the current supply through the circuit in which they are inserted.

It is well known that in a system comprising two electrically connected synchronous motors, as shown in the drawings, if the rotor of the transmitter is brought to a given angular position when the current is off, as soon as the current is made to flow through the circuit the rotor of the receiver will instantly move to a corresponding angular position, accomplishing this movement through the shortest arc. In other words, assuming that the rotor of the transmitter has been moved more than 180 degrees in a given direction from a position corresponding to that of the rotor of the receiver, when the circuit is re-established the rotor of the receiver will not move in the same direction to occupy a corresponding position, but will move through the shortest angle, that is, in the opposite direction.

This is in a sense automatic resetting, but it is not proper automatic resetting, because when such an occurrence takes place the contact mechanism will no longer be in step with the position of the rotors. The importance of preventing the angular movement of either or both rotors from quite reaching 180 degrees is, therefore, made apparent, because when this condition is fulfilled, the shortest angle through which the rotor following the angular displacement of the other rotor will move, will always be within the limits of an arc less than 180 degrees in amplitude, and the movement of the rotor thus following towards a new angular position acquired by the leading rotor will always take place in the same direction as that in which the leading rotor has been moved from its original to its new position.

It will be understood that the circuit of motor 12 can be of any conventional design and that any other type of control means may be inserted between the switch means 24—25—26 and the armature and field 13—14 of the motor.

It will also be understood that although my invention has been described in connection with two synchronous motors, one at the transmitting end and the other at the receiving end, it is within the scope of the same to use other suitable transmitting and receiving devices, the only condition being that the device at the receiving end should have a member tending to remain in positional agreement with the movable member at the transmitting end operatively associated with the valve or other controlled device. However, the arrangement described is exceedingly simple and reliable and has proved to be satisfactory in practice.

It will also be observed that while in the switch described, spring contact means have been provided permitting relative movement of one switch member towards the other even after contact therebetween has been established, it is within the scope of my invention to adopt other arrangements producing the same results.

My invention is applicable also in other cases as will be understood. It is obvious that the details of arrangement and construction may vary from those shown without departing from the inventive idea; the drawings will therefore be understood as being intended for illustrative purposes only and not in a limiting sense; therefore, I accordingly reserve the right to carry my invention into practice in all those ways and manners which may enter, fairly, into the scope of the appended claims.

I claim:

1. In a device of the class described the combination, with a driven element and electric power driving means therefor, of a switch comprising two separately movable members, an electric circuit connecting said switch to said power driving means, contact means associated with one of said switch members permitting displacement of one member in relation to the other in either direction, even after contact therebetween has been established, means under the control of the operator for moving one of said switch members with respect to the other a predetermined amount in one or the other direction, closing said circuit so as to operate said power means in one or the other direction, means for indicating the extent and direction of the movement thereof, a transmitting device having a rotatable member operatively associated with said driven element, and an electric inductive device, electrically connected thereto, having a rotatable member operatively associated with the formerly stationary switch member, said rotatable member tending to remain in positional agreement with the rotatable member of the transmitting device, the latter being operated by the driven element so as to cause the rotatable member at the switch end to move the switch member associated therewith away from the other switch member, so as to ultimately interrupt the circuit established thereby, when the new position of said driven element, determined by said indicating means, has been reached, said operator controlled means for moving one of the switch members with respect to the other being designed so as to positively prevent the possibility of the angular displacement of the inductive device rotatable member required to interrupt the circuit reaching 180°.

2. In a device of the class described the combination, with a driven element and electric power driving means therefor, of a switch comprising two separately movable members, an electric circuit connecting said switch to said power driving means, contact means associated with one of said switch members permitting displacement of one member in relation to the other in either direction, even after contact therebetween has been established, means under the control of the operator for moving one of said switch members with respect to the other a predetermined amount in one or the other direction, closing said circuit so as to operate said power means in one or the other direction, an electric inductive device having a rotatable member operatively associated with said driven element, and another electric inductive device electrically connected thereto, having a rotatable member operatively associated with the formerly stationary switch member, said movable member tending to remain in positional agreement with the rotatable member at the driven element end, the latter being operated by the driven element so as to cause the movable member at the switch end to move the switch member associated therewith away from the other switch member, so as to ultimately interrupt the circuit established thereby, said operator controlled means for moving one of the switch members with respect to the other being designed so as to positively prevent the possibility of the angular displacement of the inductive device rotatable member required to interrupt the circuit reaching 180°.

3. In a device of the class described the combination, with a driven element, electric power driving means therefor, a switch comprising two separately movable members, an electric circuit connecting said switch to said power driving means, contact means associated with one of said switch members permitting displacement of one of said switch members with respect to the other even after contact therebetween has been established, means under the control of the operator for moving one of said switch members with respect to the other a predetermined amount, an electric inductive device having a rotatable member operable simultaneously with said driven element, and another electric inductive device having a rotatable member operatively associated with the formerly stationary switch member, said rotatable member tending to remain in positional agreement with the rotatable member of the inductive device at the driven element end, of means for operatively associating the latter rotatable member with the driven element, said means being designed to positively prevent the possibility of the angular displacement of said rotatable member reaching 180°, for a total displacement of said driven element from one of its extreme positions to the other.

4. In a system of remote control comprising two electric inductive devices electrically connected to each other, said devices each comprising a rotatable member, the rotatable member of one device tending to remain in positional agreement with the rotatable member of the other device, means for operating one of said rotatable members to cause a corresponding operation of the other, said means limiting the possible angular displacement of the rotatable member operated thereby to less than 180 degrees.

5. In a system of remote control comprising a movable element at the controlled end, a switch comprising two separately movable members at the controlling end, a transmitting device having a movable member operatively associated with said movable element, and an electric inductive device having a rotatable member controlled by said transmitting device movable member, and operatively associated with one of said movable switch members, a circuit controlled by said switch, controlling the operation of said movable element, means under the control of the operator for moving the other switch member against the switch member associated with said rotatable member, said means permitting continued movement of said hand controlled member in the circuit closing direction, even after contact between the two switch members has been established, and means preventing the possibility of said rotatable member being displaced by said hand controlled switch member an angle exceeding 180 degrees.

6. In a device of the class described the combination, with a driven element and electric power driving means therefor, of a switch comprising two separately movable members, an electric circuit connecting said switch to said power driving means, contact means associated with one of said switch members permitting displacement of one member in relation to the other in either direction, even after contact therebetween has been established, means under the control of the operator for moving one of said switch members with respect to the other a predetermined amount in one or the other direction, closing said circuit so as to operate said power means in one or the other direction, a transmitting device having a rotatable member operatively associated with said driven element, and an electric inductive device, electrically connected thereto, having a rotatable member operatively associated with the formerly stationary switch member, said rotatable member tending to remain in positional agreement with the rotatable member of the transmitting device, the latter being operated by the driven element so as to cause the rotatable member at the switch end to move the switch member associated therewith away from the other switch member, so as to ultimately interrupt the circuit established thereby, when the new position of said driven element has been reached, said operator controlled means for moving one of the switch members with respect to the other being designed so as to positively prevent the possibility of the angular displacement of the inductive device rotatable member required to interrupt the circuit, reaching 180°.

7. In a device of the class described the combination, with a driven element, electric power driving means therefor, a switch comprising two separately movable members, an electric circuit connecting said switch to said power driving means, contact means associated with one of said switch members permitting displacement of one of said switch members with respect to the other even after contact therebetween has been established, means under the control of the operator for moving one of said switch members with respect to the other a predetermined amount, an electric inductive device having a rotatable member operable simultaneously with said driven element, and another electric inductive device having a rotatable member operatively associated with the formerly stationary switch member, said rotatable member tending to remain in positional agreement with the rotatable member of the inductive device at the driven element end, of means for operatively associating the latter rotatable member with the driven element, said means being designed to positively prevent the possibility of the angular displacement of said rotatable member reaching 180°, for a total displacement of said driven element from one of its extreme positions to the other, said operator controlled means for moving one of the switch members with respect to the other being designed so as to positively prevent the possibility of the angular displacement of the inductive device rotatable member required to interrupt the circuit reaching 180°.

8. In a system of remote control comprising a transmitting and a receiving device, electrically connected to each other, each device including a synchronous motor having a rotor element tending to remain in positional agreement with the rotor element of the other, means preventing the maximum angular displacement of either rotor element from quite reaching 180°, thereby preventing the possibility of one rotor element getting out of step with the other.

9. In a system of remote control comprising a transmitting and a receiving device, electrically connected to each other, each device including a synchronous motor having a rotor element tending to remain in positional agreement with the rotor element of the other, means preventing the maximum angular displacement of each rotor element from quite reaching 180°, thereby preventing the possibility of said rotor elements getting out of step with each other.

10. A system of remote control comprising a transmitting device and a receiving device electrically connected to each other, each device including a synchronous motor having a rotor element tending to remain in positional agreement with the rotor element of the other, a mechanism to be controlled by said devices, a controlling index, means of connection between said mechanism and the rotor element of said transmitting device arranged so that complete movement of said mechanism will result in a less than a 180° rotation of said rotor, and means of connection between the said controlling index and the rotor element of said receiving device, whereby full movement of said index will cause less than a 180° rotation of said rotor, whereby operation of said control index will cause related directional movement of said controlled mechanism.

11. In a system of remote control comprising a transmitting and a receiving device, electrically connected to each other, each device including a synchronous motor having a rotor element tending to remain in positional agreement with the rotor element of the other, an index and controlling devices adapted to be connected therewith, means for preventing the possibility of one rotor element getting out of step with the other, comprising means for connecting said rotor elements to said index and controlling devices and arranged to limit the maximum angular displacement of either rotor element to less than 180°.

12. In a system of remote control comprising a transmitting and a receiving device, electrically connected to each other, each device including a synchronous motor having a rotor element tending to remain in positional agreement with the rotor element of the other, an index and controlling devices adapted to be connected therewith, means for preventing the possibility of one rotor element getting out of step with the other, comprising means for connecting said rotor elements to said index and controlling devices and arranged to limit the maximum angular displacement of each rotor element to less than 180°.

13. In a system of remote control comprising a transmitting and a receiving device, electrically connected to each other, each device including a synchronous motor having a rotor element tending to remain in positional agreement with the rotor element of the other, an index and controlling devices adapted to be connected therewith, means for preventing the possibility of one rotor element getting out of step with the other, comprising means for connecting said rotor elements to said index and controlling devices and arranged to limit the maximum angular displacement of either rotor element to less than 180° while providing for full movement of the index and controlling devices through relatively greater angles.

14. In a system of remote control comprising a transmitting and a receiving device, electrically connected to each other, each device including a synchronous motor having a rotor element tending to remain in positional agreement with the rotor element of the other, an index and controlling devices adapted to be connected therewith, means for preventing the possibility of one rotor element getting out of step with the other, comprising means for connecting said rotor elements to said index and controlling devices and arranged to limit the maximum angular displacement of each rotor element to less than 180° while providing for full movement of the index and controlling devices through relatively greater angles.

15. In a system of remote control comprising a transmitting and a receiving device, electrically connected to each other, each device including a synchronous motor having a rotor element tending to remain in positional agreement with the rotor element of the other, an index device comprising a rotatable member controlling the operation of and so connected to one of said rotor elements that any angular movement of said member will cause an angular movement of the rotor element controlled thereby, of less than 180°, even though said member may be caused to rotate through an angle greater than 180°.

16. In a system of remote control comprising a transmitting and a receiving device, electrically connected to each other, each device including a synchronous motor having a rotor element tending to remain in positional agreement with the rotor element of the other, an index device comprising a rotatable member controlling the operation of and so connected to one of said rotor elements that full movement of said member from one of its extreme positions to the other, will cause an angular movement of the rotor element controlled thereby, of less than 180°.

17. In a system of remote control comprising a transmitting and a receiving device, electrically connected to each other, each device including a synchronous motor having a rotor element tending to remain in positional agreement with the rotor element of the other, an index device comprising a rotatable member controlling the operation of and so connected to one of said rotor elements that full movement of said member from one of its extreme positions to the other, will cause an angular movement of the rotor element controlled thereby, of less than 180°, even though said full movement may be greater than 180°.

18. In a system of remote control comprising a transmitting and a receiving device, electrically connected to each other, each device including a synchronous motor having a rotor element tending to remain in positional agreement with the rotor element of the other, an index device comprising a rotatable member controlling the operation of and so connected to said transmitting device that any angular movement of said member will cause an angular movement of the rotor element of the transmitting device less than 180° even though said member may be cause to rotate through an angle greater than 180°.

19. In a system of remote control comprising a transmitting and a receiving device electrically connected to each other, each device including a synchronous motor having a rotor element tending to remain in positional agreement with the rotor element of the other, an index device comprising a rotatable member controlling the operation of and so connected to said transmitting device, that full movement of said member from one of its extreme positions to the other, will cause an angular movement of the rotor element of said transmitting device of less than 180°.

20. In a system of remote control comprising a controlled device, a transmitting device including a synchronous motor having a rotor element operatively associated with said controlled device, a receiving device comprising a synchronous motor electrically connected to the synchronous motor of the transmitting device and having a rotor element tending to remain in positional agreement with the rotor element of said transmitting device, and means for controlling said controlled device, operative connections between said controlled device and the rotor element connected thereto so arranged that full operation of said controlled device will cause an angular movement of said rotor element of less than 180°.

21. In a system of remote control comprising a controlled device, a transmitting device including a synchronous motor having a rotor element operatively associated with said controlled device, and a receiving device comprising a synchronous motor electrically connected to the synchronous motor of the transmitting device and having a rotor element tending to remain in positional agreement with the rotor element of said transmitting device, of means associated with the rotor element of said receiving device, for controlling the operation of said controlled device, said controlling means including a rotatable index member and being arranged so that full operation of said index member will result in an angular displacement of said rotor elements of less than 180°, even though said index member may be rotated through a relatively greater angle.

22. In a system of remote control comprising a controlled device, a transmitting device including a synchronous motor having a rotor element operatively associated with said controlled device, and a receiving device comprising a synchronous motor electrically connected to the synchronous motor of the transmitting device and having a rotor element tending to remain in positional agreement with the rotor element of said transmitting device, of means associated with the rotor element of said receiving device, for controlling the operation of said controlled device, said controlling means including a rotatable index member arranged to control, indicate and predetermine the extent of the movement of said controlled device from on position to another, said controlled device being so connected to its corresponding rotor element that full operation of said controlled device will cause an angular movement of said rotor element of less than 180°.

LEO A. HUDSON.